United States Patent [19]

Sarem

[11] 3,900,069
[45] Aug. 19, 1975

[54] RECOVERY OF PETROLEUM BY FLOODING WITH VISCOUS AQUEOUS SOLUTIONS OF ACRYLAMIDE-DIACETONE ACRYLAMIDE COPOLYMERS

[75] Inventor: Amir M. Sarem, Yorba Linda, Calif.

[73] Assignee: Union Oil Company of California, Brea, Calif.

[22] Filed: July 11, 1974

[21] Appl. No.: 487,611

[52] U.S. Cl. ............ 166/274; 166/275; 252/8.55 D
[51] Int. Cl.² ......................................... E21B 43/22
[58] Field of Search ........ 166/273, 274, 275, 305 R, 166/306; 252/8.55 D

[56] References Cited
UNITED STATES PATENTS

| | | | |
|---|---|---|---|
| 3,025,237 | 3/1962 | Roper | 252/8.55 D |
| 3,039,529 | 6/1962 | McKennon | 252/8.55 D |
| 3,451,480 | 6/1969 | Zeh, Jr. et al. | 166/308 |
| 3,476,168 | 11/1969 | Sarem | 166/274 |
| 3,704,990 | 12/1972 | Sarem | 166/273 |

Primary Examiner—Stephen J. Novosad
Assistant Examiner—George A. Suckfield
Attorney, Agent, or Firm—Gerald L. Floyd; Richard C. Hartman; Dean Sandford

[57] ABSTRACT

A process for recovering petroleum from subterranean oil-bearing formations in which a viscous flooding medium comprising a dilute aqueous solution of a copolymer of acrylamide and diacetoneacrylamide is introduced into the oil-bearing formation through one or more injection wells and forced toward at least one spaced production well.

9 Claims, No Drawings

3,900,069

RECOVERY OF PETROLEUM BY FLOODING WITH VISCOUS AQUEOUS SOLUTIONS OF ACRYLAMIDE-DIACETONE ACRYLAMIDE COPOLYMERS

BACKGROUND OF THE INVENTION

1. Field of the Invention

This invention relates to the recovery of petroleum from subterranean oil-bearing formations, and more particularly concerns the recovery of oil from subterranean formations by a waterflooding process.

2. Description of the Prior Art

In the secondary recovery of petroleum by water flooding it has been proposed to employ aqueous media rendered more viscous than ordinary water or brine by the incorporation therein of watersoluble agents such as water-soluble organic polymers. It has been found that polymer compositions containing amide and carboxyl or carboxylate groups are useful as thickening agents to render aqueous flooding media employed in the recovery of petroleum by waterflooding more viscous than ordinary water or brine. Acrylic type polymers are widely used for this purpose since they have a most unusual and unexpected effect on the flow characteristics of water, i.e., by reducing water mobility in porous media such as reservoir rock. These polymers can be prepared by copolymerizing acrylamide and acrylic acid or by the controlled hydrolysis of polyacrylamide.

These polymers may exhibit varying degrees of resistance to flow, depending not only on the specific polymer being used but also on the nature of the water in which it is dissolved, and the mineral composition of the porous medium. This resistance property is exhibited only when the polymer solution is flowing through a microporous medium in which the flow paths are tortuous. The resistance factor describes the decrease in the mobility of a polymer solution in comparison with the flow of water or brine in which it is prepared, and in waterflooding operations the higher resistance factor flooding media results in improved mobility ratios and greater oil recovery at economic limit.

Illustrative of teachings with regard to the use of acrylic polymers as aqueous flooding media are U.S. Pat. No. 2,827,964 issued to Sandiford et al.; U.S. Pat. No. 3,002,960 issued to Kolodny; and U.S. Pat. No. 3,039,529 issued to McKennon. While these compositions are satisfactory in many well-drilling and treating applications and their use has contributed greatly to increased oil recovery, they have not been completely successful in waterflood operations. One difficulty is their lack of versatility since they suffer reduced mobility reduction characteristics in solutions containing divalent alkaline earth metal salts. Inasmuch as the disposal of produced brine containing high concentrations of these salts is a problem, it is highly desirable to use an acrylic-type polymer in waterflooding operations which possesses an improved mobility reduction property, especially in flood waters containing divalent alkaline earth metal salts. Not only will the need for water which does not contain high concentrations of divalent alkaline earth metal salts be eliminated but the problem of disposing of the produced brines can be overcome, since they can be utilized as carrier liquids for the treating fluid.

In addition to their utility as mobility reduction agents, acrylic-type polymers have also been used as friction reducing agents in oilfield operations. For example, the teaching of adding small amounts of an acrylamide and diacetone-acrylamide copolymer to an aqueous fracturing fluid reduces friction loss due to turbulent flow is disclosed in U.S. Pat. No. 3,451,480.

SUMMARY OF THE INVENTION

The invention relates to a process for recovering petroleum from a subterranean oil-bearing formation in which a flooding medium comprising an aqueous solution of an acrylamide-diacetone acrylamide copolymer is injected through an input well penetrating said formation and is forced through said formation towards at least one spaced output well, and petroleum is recovered from said output well. The process is particularly useful in flooding operations where divalent alkaline earth metal salts such as barium, calcium and magnesium salts or mixtures thereof are dissolved in the aqueous flooding medium.

DESCRIPTION OF THE PREFERRED EMBODIMENTS

The present invention contemplates a flooding process in which the flooding medium is a dilute aqueous solution of a copolymer of acrylamide and diacetoneacrylamide. These water-soluble copolymers, useful for thickening aqueous flooding solutions and particularly aqueous flooding solutions of divalent alkaline earth metal salts such as salts of barium, calcium and magnesium, can be prepared by the copolymerization of acrylamide and diacetoneacrylamide by conventional copolymerization procedures. For example, the various copolymerization methods taught in U.S. Pat. No. 3,451,480 to Zeh and Bischof are suitable. Most preferred methods are the redox catalyst system disclosed in U.S. Pat. No. 3,002,960 to Kolodny and the organoboron-oxygen treated catalysts disclosed in U.S. Pat. No. 2,985,633 to Welch and U.S. Pat. No. 3,663,490 to Sarem. The process for preparing the aqueous flooding agent can be adapted for practice at the well site, thus avoiding the unnecessary cost associated with flooding processes applying prior art thickening agents.

More specifically the invention involves an oil recovery process in which oil is displaced from a subterranean oil-bearing formation by a viscous, aqueous solution of an acrylamide-diacetone acrylamide copolymer. The aqueous flooding solution is injected through one or more of the injection or input wells penetrating the oil-bearing formation, and forced through the formation toward at least one production or output well which is likewise completed in the formation. As the flooding medium passes through a formation it displaces the residual oil therein and carries it into the producing well where it can be recovered by conventional means. The injection and production wells can be arranged in any convenient pattern, such as the conventional "five spot" pattern when a central producing well is surrounded by four somewhat symmetrically located injection wells. Another of the many conventional flooding patterns that can be employed in the practice of this invention is the "line drive" pattern in which the injection wells are arranged in a line so that the injected flooding medium advances through the formation to displace oil toward one or more spaced production wells that can be arranged in a line substantially parallel to the line of the injection wells. Also, the flooding agents of this invention can be employed in a "slug" type process wherein a quantity of polymer solution such as from about 0.005 to 1 pore volume, and more preferably from about 0.1 to 0.8 pore volume, is injected into a formation and displaced therethrough by a subsequently injected drive fluid.

The acrylamide-diacetone acrylamide copolymers found useful in accordance with this invention to reduce the mobility characteristic of aqueous flood water are subsequently linear, water-soluble polymers having amide and diacetone substituted pendant groups arranged along a substantially carbon-carbon chain. Although the length of the molecular chain and the proportion and distribution of the amide and diacetone substituted pendant groups are variable, the copolymers of this invention are characterized by the generalized formula:

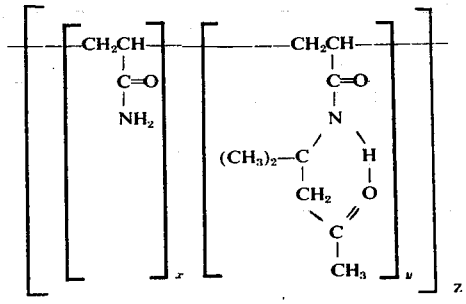

wherein $x$ and $y$ represent respectively the average number of acrylamide monomer units and diacetone acrylamide monomer units in the polymer per 100 monomer units of the polymer; and wherein $z$ represents the average number of 100 monomer units in the polymer.

The proportions of the various monomer units in the polymer, their distribution along the carbon-carbon chain, and the length of the chain can vary over a wide range, thereby providing a family of polymers having different molecular weights and water solubilities, and differing in other important properties which render certain of these copolymers peculiarly suited for specific applications. It is preferred that the copolymers be in an unhydrolyzed form for best performance in an aqueous flooding medium. Thus, the composition and structure of the copolymers of this invention can vary over wide ranges, but it has nevertheless been found that a number of useful acrylamide-diacetone acrylamide copolymers can be defined by the foregoing generalized formula wherein $x$ is an integer from about 75–99, $y$ is an integer from about 1–25 and $z$ varies up to about 8,000. Preferred copolymers according to the foregoing generalized formula are wherein $x$ is an integer from about 90–98 and $y$ is an integer from about 2–10. The copolymers in accordance with this invention are characterized by high molecular weight and the ability to increase the screen resistance factor characteristic of aqueous solutions containing divalent alkaline earth metal salts; and it is possible to obtain these aqueous solutions having increased reluctance to flow characteristics with the use of a minimum amount of polymeric ingredient. The copolymers found useful as flooding agents are characterized by average molecular weights of at least 500,000 and molecular weights of 1,000,000 or more are preferred with some of the more preferred polymers having molecular weights of up to 40,000,000 or more. The molecular weight of the copolymer is correlated with the viscosity of the standard solution of the polymer under controlled conditions.

The copolymers of this invention are also characterized by their ability in dilute solution to decrease the mobility of the solution in porous media below that expected from a consideration of the solution viscosity. This characteristic of high reluctance to flow in porous media can be quantified by the resistance factor which is defined as the ratio of the mobility of a brine solution to the mobility of the polymer in a permeable body having residual oil saturation. This relationship can be expressed as:

$$R = \frac{\lambda w}{\lambda p} = \frac{\frac{\kappa w}{\mu w}}{\frac{\kappa p}{\mu p}}$$

wherein, $R$ = Resistance Factor
$\lambda_w$ = Mobility of brine
$\lambda_p$ = Mobility of polymer solution
$\kappa_w$ = Permeability to brine (darcies)
$\kappa_p$ = Permeability to polymer solution (darcies)
$\mu_w$ = Viscosity of brine (cp.)
$\mu_p$ = Viscosity of polymer solution (cp.)

The resistance factor can be determined by measuring the flow rate of a brine and a polymer solution through an open porous medium and calculating the resistance factor as a ratio of the measured flow rates at equal pressure drop. The open porous medium can be a core sample to yield results as the resistance factor (core resistance factor) or it can be a pack of 100 mesh screens; the results are then given as screen resistance factor ($R_s$). The screen resistance factor test is described by Jennings et al. in Transactions of the Society of Petroleum Engineers, vol. 251, pages 391–401 (1971).

The screen resistance factor apparatus, as described therein, has a measured fluid volume of about 30 ml and consists of a pack of five 0.25 -in. diameter, 100 mesh stainless steel screens. As with a capillary viscometer, average flow rates are obtained by timing the fall of a fluid level from an index mark at the entrance of a glass bulb to one at the exit. The water flow time is 8 to 10 seconds. All fluids are first filtered through a 200-mesh screen to avoid plugging the apparatus. The results of the measurements are reported herein as screen resistance factor (referred to in Jennings et al. publication as "screen factor"). The correlation between resistance factor and screen resistance factor is linear.

Preferred acrylamide diacetone-acrylamide copolymers useful in the practice of this invention are prepared by copolymerizing acrylamide and diacetone-acrylamide in an 2-4solution with an oxygen treated organo-boron catalyst such as described in my previously issued U.S. Pat. No. 3,663,490. Diacetone acrylamide, also known as N[2-(2-4-oxo pentyl)] acrylamide is a water soluble substituted acrylamide that can be prepared by the reaction of acrylamide and diacetone alcohol. According to one specific mode of practicing the invention, an aqueous solution containing up to about 50 weight percent of reactant monomers, and more preferably from about 10 to about 30 weight percent of monomers, is charged to a closed reaction vessel. Air is removed from the vessel by purging with a substantially oxygen-free inert gas, such as nitrogen or helium, or by successively evacuating the air space above the liquid and purging with inert gas. A substantially oxygen-free atmosphere is maintained during the reaction to prevent additional quantities of oxygen from being absorbed into the solution. Also, the reactant solution can be stripped of a substantial portion of the dissolved oxygen by passing an oxygen-free inert gas through the liquid. The polymerization reaction is initiated by the injection of the organoboron catalyst, preferably in an amount equivalent to at least 5–200 parts of boron per million parts of monomers. The reactant solution is preferably agitated sufficiently to mix the catalyst into the solution and then agitation is discontinued during the bulk of the reaction period. Agitation can variously be effected by shaking the reaction vessel, by mechanical mixing, or by bubbling a stream of inert gas through the reactant liquid. As hereinabove disclosed, temperatures are desirably controlled below 65°C. during the reaction. The polymerization reaction is complete within a period of several days, and often within a period of a few hours. The resulting polymeric product is a viscous liquid or gel comprising a substantially linear water-soluble copolymer having a minimum of crosslinking and which possesses superior water thickening and other desirable properties, these properties are to some extent controlled by the selection of monomer proportions and the reaction conditions. Alternatively, the viscous or gelatinous polymer product can be diluted and immediately used at the well site or it can be dehydrated to obtain a solid polymer that can be stored and transported to a field location as desired. In this latter mode of operation, the flooding medium is prepared by dissolving the solid polymer in water or brine, but preferably in aqueous solution of divalent alkaline earth metal salts, particularly barium, calcium and magnesium salts, in conventional manner.

In another preferred embodiment specific classes of redox catalyst systems may also be used to produce the copolymers of this invention in accordance with those disclosed in U.S. Pat. No. 3,002,960. These are mixtures of water-soluble persulfates, for example, an alkali metal or ammonium persulfate, or with peroxides such as hydrogen peroxide and the like; and as another class, mixtures of water-soluble bromates such as alkali metal bromate with water-soluble sulfite reducing agents such as sodium sulfite or sodium bisulfite. When these redox catalyst systems are used it is possible to obtain copolymers with the properties discussed above by controlling the polymerization temperature and the molar ratios of the two ingredients of the redox catalysts system.

The invention can be illustrated further by the following examples which are illustrative of specific modes of preparing and using the copolymers in accordance with this invention and are not intended as limiting the scope of the invention as defined by the appended claims.

EXAMPLE 1

A reactant solution is prepared by dissolving 10.5 parts by weight of acrylamide and 4.5 parts by weight of diacetoneacrylamide and 85 parts by weight water. The reactant solution is placed in a closed vessel and the vessel is evacuated and purged with helium. A helium blanket is maintained in the vessel during the reaction. Copolymerization of the reactants is initiated by the addition of a solution of triethyl boron dissolved in dioxane. Upon completion of the reaction the gelatinous product is air cured for 1.75 hours and diluted with 3 percent by weight sodium chloride solution.

EXAMPLE 2

A second copolymer is prepared substantially in accordance with the procedure of Example 1 excepting that upon completion of the reaction the gelatinous product is air cured for 3 hours prior to dilution with 3 percent by weight sodium chloride solution.

The Brookfield viscosities and screen resistance factors of 0.05 weight percent solutions of the acrylamide-diacetone acrylamide copolymers of Examples 1 and 2 in distilled water, in 3 weight percent sodium chloride brine, in fresh water and in field brine are determined by conventional techniques. The analysis of the fresh water and field brine are reported in Table I.

These results are compared with the viscosity and screen resistance factor characteristics of 0.05 weight percent solutions of prior art polymers such as acrylic acid-acrylamide-diacetone acrylamide terpolymers, and by other commercially available polymers generally used in waterflooding operations. The results of these tests are reported in Table II.

TABLE I

| COMPOSITION OF FRESH WATER AND FIELD BRINE, PPM | | |
|---|---|---|
| | Fresh Water | Field Brine |
| $Na^+$ | 45 | 29,000 |
| $Ca^{++}$ | 55 | 5,100 |
| $Mg^{++}$ | 18 | 1,300 |
| $HCO_3^-$ | 170 | -- |
| $SO_4^{--}$ | 70 | 400 |
| $Cl^-$ | 80 | 53,000 |
| TDS* | 400 | 98,000 |

*Total Dissolved Solids

TABLE II

| | | | RESISTANCE FACTOR Rs | | | | VISCOSITY BROOKFIELD 6 RPM 75° | | | |
|---|---|---|---|---|---|---|---|---|---|---|
| POLYMER | | Carboxyl Content | Distilled $H_2O$ | Fresh Water | 3% NaCl | Field Brine | Distilled $H_2O$ | Fresh Water | 3% NaCl | Field Brine |
| Example 1 | (DAA-A) | 0 | 7.7 | 35.0 | 6.9 | 26.0 | 5.4 | 3.6 | 5.5 | 2.5 |
| Example 2 | (DAA-A) | 0 | 7.1 | 18.0 | 5.5 | 23.0 | 4.2 | 2.4 | 3.7 | 3.4 |
| Terpolymer A[1] | (DAA-A-AA) | 0 | 15.4 | 11.7 | 5.9 | 2.5 | 70.0 | 4.0 | 4.8 | 1.4 |
| Terpolymer B[2] | (DAA-A-AA) | 0 | 16.4 | 11.5 | 14.5 | 2.9 | 57.0 | 4.0 | 3.5 | 1.4 |
| Polyacrylamide | RC-290[a] | 0 | 5.5 | 12.6 | 7.1 | 11.9 | 2.3 | 3.0 | 2.5 | 4.1 |
| | RC-330[b] | 0-5 | 12.4 | 25.4 | 6.9 | 13.7 | 38.0 | 16.0 | 2.9 | 3.4 |
| | RC-345[c] | 10–15 | 12.7 | 11.9 | 4.0 | 7.0 | 23.0 | 9.0 | 2.6 | 3.1 |
| | RC-346[d] | 30 | 20.3 | 13.5 | 8.0 | 7.5 | 43.0 | 11.0 | 2.8 | 2.6 |
| PUSHER | 700[e] | 30 | 27.0 | 11.0 | 18.6 | 11.0 | 70.0 | 8.0 | 3.6 | 2.5 |
| Dow | ET-601[f] | 30 | 12.5 | 1.5 | 6.6 | 1.3 | 45.0 | 1.4 | 2.8 | 1.2 |

[1]Corresponds terpolymer of acrylic acid-acrylamide-diacetone acrylamide prepared according to U.S. Pat. No. 3,663,490 using trialkyl boron catalysts.
[2]Corresponds to terpolymer of acrylic acid-acrylamide-diacetone acrylamide prepared according to U.S. Pat. No. 3,002,960 using a redox catalyst system.
[a,b]"Polyacrylamide homopolymers marketed by American Cyanamid Co., New York, N.Y.
[c,d,e]Partially hydrolyzed polyacrylamide marketed by Dow Chemical Company, Midland, Michigan
[f]Partially hydrolyzed polyacrylamide marketed by Dow Chemical Company, Midland, Michigan The data demonstrate the marked superiority of the acrylamide-diacetone acrylamide copolymers as additives for flood waters containing soluble divalent alkaline earth metal salts and particularly those containing soluble calcium and magnesium salts. It is apparent from the foregoing Table II that a flooding medium comprising an acrylamide-diacetone acrylamide copolymer unexpectedly yields greatly improved screen resistant factor characteristics over a wide concentration range of divalent alkaline earth metal salts compared to known prior art polymers generally used for waterflooding purposes. Note, for example, that the closely related Terpolymer A and Terpolymer B exhibit markedly decreased screen resistant factor properties in the fresh water and field brine conntaining dissolved divalent metal ions as compared with distilled water, whereas the screen resistance factor properties of the copolymers of this invention are in fact increased in the presence of the divalent ions. This data demonstrates the marked superiority of the copolymers of this invention as an additive for flood water, especially in aqueous solutions of divalent alkaline earth metal salts and particularly in waters containing calcium and magnesium salts. It follows that the increased screen resistance factor properties are directly related to improved mobility ratios which in turn are related to increased oil recovery.

EXAMPLE 3

An oil-bearing subterranean strata is flooded with a viscous flooding medium in accordance with the method of this invention. The flooding medium is a dilute aqueous solution of acrylamide and diacetone acrylamide copolymer prepared by the copolymerization of the monomers at the well site. A monomer mixture of 10.5 parts by weight acrylamide and 4.5 parts by weight of diacetone acrylamide is charged to a reaction vessel and dissolved in water to make a reactant solution of 15 percent monomers. This vessel is closed and evacuated to remove air from the space above the reactant solution, and the vacuum is broken with helium gas. The evacuation and purging steps are repeated three times to remove substantially all of the undissolved air from the vessel. A helium atmosphere is maintained during the reaction.

The copolymerization reaction is initiated by adding triethyl boron dissolved in dioxane to the reactant solution at an amount equivalent to 200 parts of boron per million parts of monomer, and briefly agitating the reaction liquid to assure mixing of the catalyst. After about 24 hours the polymerization reaction is complete and the gelatinous product is diluted with water.

The resulting polymer concentrate is then metered into an aqueous brine solution to provide therein a polymer concentration of about 0.05 weight percent. The polymer solution is injected into the oil-bearing formation through four injection wells arranged in a "five spot" pattern around a central production well. Oil and other fluids are produced from the production well in conventional manner.

EXAMPLE 4

A flooding operation is practiced in accordance with Example 3, wherein the polymer solution is injected into the formation in the amount of 0.05 pore volume, and is followed by the injection of field brine to displace the polymer solution towards the production well.

Various embodiments and modifications of this invention have been described in the foregoing description and examples and further modifications will be apparent to those skilled in the art. Such modifications are included within the scope of this invention as defined by the following claims.

I claim:

1. In a process for recovering petroleum from a subterranean oil-bearing formation in which a viscous flooding medium is injected through an input well penetrating said formation and forced through said formation towards at least one spaced output well and petroleum is recovered from said output well, the improvement which comprises employing as said flooding medium an aqueous solution of an acrylamidediacetone acrylamide copolymer.

2. The process defined in claim 1 wherein said aqueous flooding medium contains dissolved divalent alkaline earth metal salts.

3. The process defined in claim 2 wherein said divalent alkaline earth metal salts include water-soluble salts of barium, calcium and magnesium, and mixtures thereof.

4. The process defined in claim 1 wherein said aqueous solution contains about 0.002 to 0.5 weight percent of said copolymer.

5. The process defined in claim 1 wherein about 0.005 to 1.0 pore volumes of said aqueous solution are injected into said input well and forced through said formation by the subsequent injection of a driving fluid.

6. In the process of recovering petroleum from a subterranean oil-bearing formation in which a viscous flooding medium comprising an aqueous solution of a water soluble organic polymer is injected through an input well penetrating said formation and forced through said formation towards at least one spaced output well and petroleum is recovered from said output well, the improvement which comprises employing as said flooding medium an aqueous solution of an acrylamide-diacetone acrylamide copolymer having the following generalized formula:

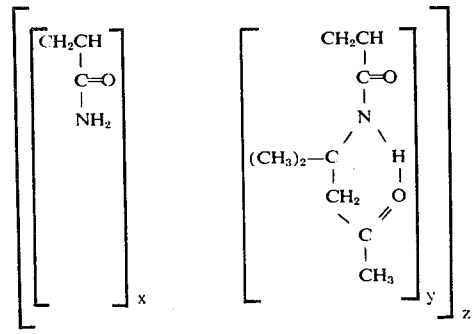

wherein x is an integer from about 75–99; y is an integer from about 1–25, and z is an integer up to about 8,000.

7. The process defined in claim 6 wherein $x$ is an integer from about 90–98 and $y$ is an integer from about 2–10.

8. The method defined in claim 6 wherein said aqueous diluting liquid contains divalent alkaline earth metal salts.

9. The method defined in claim 8 wherein said divalent alkaline earth metal salts include water soluble salts of barium, calcium, magnesium salts and mixtures thereof.

* * * * *

UNITED STATES PATENT AND TRADEMARK OFFICE
CERTIFICATE OF CORRECTION

PATENT NO. : 3,900,069
DATED : August 19, 1975
INVENTOR(S) : AMIR M. SAREM

It is certified that error appears in the above-identified patent and that said Letters Patent are hereby corrected as shown below:

References Cited: U. S. Patent 3,476,168 should be --3,476,186--.

Claim 6. Column 9, line 67 - "1-25," should be "1-25;"

Signed and Sealed this thirtieth Day of December 1975

[SEAL]

Attest:

RUTH C. MASON
Attesting Officer

C. MARSHALL DANN
Commissioner of Patents and Trademarks